United States Patent
Vitticore et al.

[11] 3,888,205
[45] June 10, 1975

[54] ARTICLE HAVING A SIGHT GLASS AND METHOD OF MAKING THE SAME

[75] Inventors: Julius M. Vitticore, Clyde, N.Y.; David N. Mooney, Moreland Hills, Ohio

[73] Assignee: Parker-Hannifin Corporation, Cleveland, Ohio

[22] Filed: Nov. 12, 1973

[21] Appl. No.: 415,178

[52] U.S. Cl.................. 116/117 C; 65/39; 65/59
[51] Int. Cl............................................ C03c 27/02
[58] Field of Search............... 65/59, 39; 116/117 C

[56] References Cited
UNITED STATES PATENTS
3,347,651  10/1967  Lueck.................................... 65/39

FOREIGN PATENTS OR APPLICATIONS
860,434  2/1961  United Kingdom..................... 65/59

Primary Examiner—Arthur D. Kellogg
Attorney, Agent, or Firm—John N. Wolfram

[57] ABSTRACT

An article comprising a metal member having a sight glass mounted therein. The metal member has a bore and a counterbore with an opening in between that is smaller in diameter than either whereby there is a transverse surface at each end of the opening. The sight glass is fused to the walls of the counterbore and opening but does not extend into the bore radially outwardly of the opening. The invention also embraces the method of fusing a sight glass into a metal part which comprises the steps of providing a metal part as described above, inserting a glass disk in the counterbore, applying heat to the parts that is high enough to simultaneously braze other metallic parts to the metal part and to soften the glass so that it will flow by gravity into fused contact with the wall of the counterbore and also flow into the bore but will be limited in its flow through the opening by cohesive forces in the glass that prevents the glass from flowing radially outwardly along the transverse surface between the bore and opening.

8 Claims, 6 Drawing Figures

3,888,205

PATENTED JUN 10 1975

ARTICLE HAVING A SIGHT GLASS AND METHOD OF MAKING THE SAME

BACKGROUND OF THE INVENTION

It is known in the art to fuse glass disks into metal fluid containing devices so that the glass disk may be utilized as a window for visually observing the interior of the device. Up to now, practical temperatures for softening the glass for accomplishing fusing to the metal has been limited to about 1600°F, or less, because at higher temperatures the glass softens too much and will run through the openings in the metal in an uncontrolled manner. When other metallic parts are to be copper brazed to the same piece in which a sight glass is to be mounted, as for example in the inlet cap of a receiver for an air conditioning system, a two-step process has been required because the temperatures required for copper brazing is much higher than that which has been suitable for fusing the sight glass. Thus, the brazing operation is first carried out at a temperature of about 2025°F. Because this temperature has been too high to fuse the glass in place for the reason already indicated, the glass fusing operation has been carried out in a second operation at a lower temperature.

In another method that may now be in use, the metal parts are brazed at the same time that the sight glass is fused if a silver solder is used for the metal parts because silver soldering can be accomplished at lower temperatures than copper brazing. However, silver soldering requires closer tolerance control of the parts and is otherwise more expensive.

SUMMARY OF THE INVENTION

The present invention provides a method of producing a metal article to which other metal parts may be copper brazed at the same time that a glass disk is fused to the metal article. The method comprises the steps of providing in the metal article a bore and a counterbore with an opening therebetween that is of smaller diameter than either so as to form a first transverse surface between the opening and counterbore. The metal article is also provided with another surface to which another metal part is to be copper brazed. A glass disk is then placed in the counterbore and the parts are run through a brazing furnace at a temperature of about 2025°F. This causes the metal parts to be copper brazed to each other and also softens the glass so that gravity will cause it to flow into fused engagement with the wall of the counterbore and will also cause it to flow into the opening and fuse itself to the wall thereof. However, cohesive forces within the glas will prevent the glass from flowing radially outwardly along the transverse surface between the opening and bore and will effectively limit flowing of the glass through the opening in an uncontrolled manner.

The invention also embraces the article produced by the described method.

DETAIL DESCRIPTION

Figure 1:
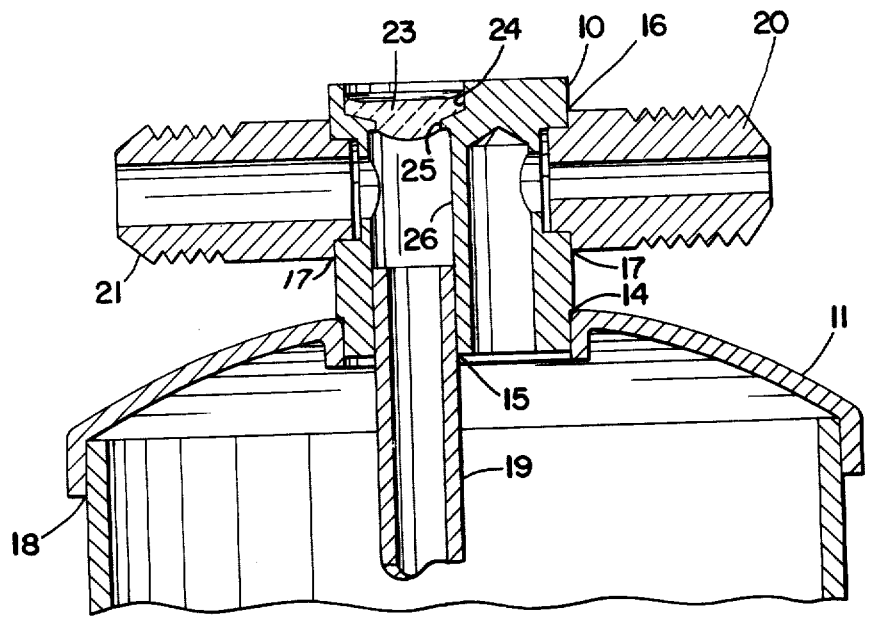
FIG. 1 is a cross section view of a device in which the invention is embodied.

As shown in FIG. 1, an example of a device in which this invention may be applied is a steel cap 10 for a steel receiver 11 that has use in an air conditioning system for an automobile. The cap is copper brazed at 14 to the receiver and also has brazed to it at 15, 16 and 17 a pickup tube 19, and tube fitting bodies 20 and 21, respectively. The cap also has a sight glass 23 fused within a counterbore 24 and an opening 25 and serves as a window so that a person can visually observe flow of refrigerant fluid from receiver 11 through pickup tube 19 and bore 26 out through coupling body 21.

Through utilization of the present invention, fusing of the glass disk 23 to part 10 is accomplished in a brazing furnace at the same time that the joints at 14, 15, 16, 17 and 18 are copper brazed.

To practice the invention, steel cap 10 is provided with the usual bore 26 for receiving tube 19 and with a counterbore 24 to receive sight glass 23. In addition, it is provided with a smaller opening 25 between bore 26 and counterbore 24 so as to form a transverse surface 30 between opening 25 and counterbore 24 and another transverse surface 31 between opening 25 and bore 26. Surface 30 is preferably at an angle of about 12° to the horizontal, or in other words it lies in a cone whose apex angle is about 156°. Surface 31 is preferably in a plane normal to the axis of opening 25 and has a sharp corner 27 of about 0.005 inch maximum break corner, that is, about 0.005 inch maximum radius or chamfer, and has a radial width of at least about 0.020 inch.

In one embodiment of the invention good results were obtained when the initial diameter of the glass disk was about ½ inch, its thickness about ⅛ inch and the diameter of opening 25 was 9/32 inch. In this embodiment the glass disk 23 had an initial diametral clearance with counterbore 24 of about 0.010 inch. The glass disk was a soda lime glass purchased from Elgin Precision Glass Company under their designation S-1 and has the following properties:

| | |
|---|---|
| Hardness | 6 Mohs' |
| Youngs Modulus | 10,000,000 lb/in$^2$ |
| Specific gravity | 2.49 at 70°F |
| Tensile Strength | 6,500 lb/in$^2$ |
| Poisson's ratio | 0.22 |
| Expansion coefficient | 8.3×10$^{-6}$ (25–300°C) |
| | 9.2×10$^{-6}$ (25–500°C) |
| Softening point | 1353°F |
| Transmission | 91% visible |
| Refractive index | 1.516 (N$_d$) |
| Thickness | .125 + .005/−.010 inches |

Figure 2:
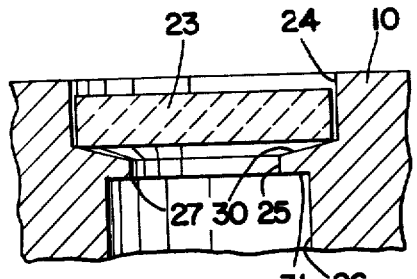
FIG. 2 is an enlarged fragmentary section view showing the glass and a metal part before fusing.
Figure 3:
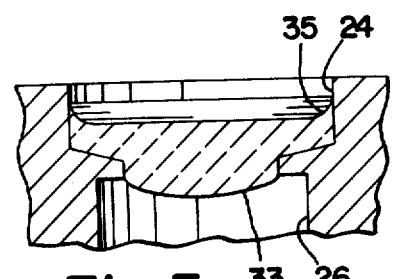
FIG. 3 is a view like FIG. 2 showing the parts after fusing.

To accomplish the assembly of FIG. 1, cap 10 is loosely assembled to the metal parts 11, 19, 20 and 21, along with suitable solder or braze material at the joints for these parts (the term "braze" as used hereinafter and in the claims denotes either of these or similar processes for uniting parts), and a glass disk 23 is inserted into counterbore 24 as shown in FIG. 2. The entire assembly is then moved into a brazing furnace in an upright position in which disk 23 is at the top and receiver 11 is at the bottom. The temperature in the furnace is maintained at about 2025°F and the parts remain in the furnace about 9 minutes and are then removed for ambient cooling.

As the parts are heating, the glass disk softens and because of the action of gravity, the glass material flows radially outwardly into contact with the wall of counterbore 24, downwardly into contact with transverse surface 30 and into opening 25. As it moves downwardly in opening 25, the lower surface of the glass assumes a convexly curved shape shown at 33 and a small meniscus 34 is formed adjacent the wall of opening 25. As the glass material flows downwardly in opening 25 it thins in counterbore 24 but in doing so it forms a meniscus 35 therein that results in a large area of fused contact with the wall of counterbore 24 even though the body of glass in counterbore 24 has thinned out considerably.

Also as the glass flows downwardly in opening 25, it will reach the bottom thereof adjacent transverse surface 31. However, at this point the meniscus 34 will be dissipated by cohesive forces within the glass and the glass does not move radially outwardly along surface 31. Instead, the cohesive forces within the glass are sufficiently strong at the imposed temperature to retain the glass within the diameter determined by opening 25 with the bottom surface of the glass remaining curved as at 33, and further downward flow of the glass discontinues.

Figure 4:
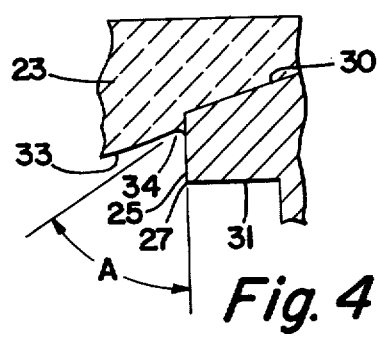
FIG. 4 is an enlarged section view showing how the glass flows from the counterbore into the smaller opening.
Figure 5:
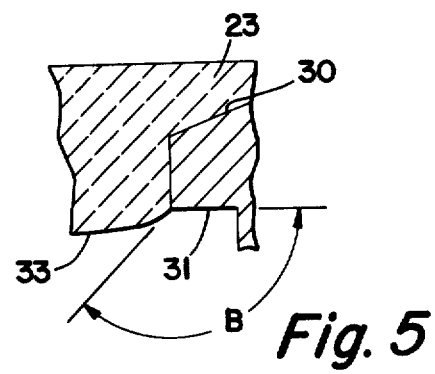
FIG. 5 shows how flow of the glass through the smaller bore becomes limited.

Discontinuance of downward flow of the glass is believed to be due directly to the presence of transverse surface 31 along with the relatively sharp corner 27. Before surface 31 was introduced, bore 26 had been continued upward to intersect with surface 30 and with this construction and with the brazing temperature of 2025°F, it was found that the glass would flow completely out of counterbore 24 and into bore 26 to the point where it would interfere with free flow of fluid from pickup tube 19 to coupling 21. When the cap was constructed with opening 25 and transverse surface 31, it was found that the glass did not flow from wall 25 to surface 31 and that the downward flow of glass would halt completely when it reached the position shown in FIG. 5. Apparently this is due to the fact that when the angle of glass surface 33 is at an acute angle, as shown at A in FIG. 4, a slight meniscus 34 is formed between the two and glass adheres to and follows the wall of opening 25. However, when transverse surface 31 is reached, the angle between this surface and the lower face of the glass becomes obtuse, as shown at B in FIG. 5, and the cohesive forces in the glass tending to "bead up" or hold the glass in one body is sufficient to overcome surface adhesion which would otherwise permit the glass to flow from the surface of opening 25 to surface 31.

Thus, transverse surface 31 is effective for halting the downward flow of glass at the higher temperature utilized for copper brazing so that both the brazing and the fusing operations can be accomplished simultaneously without using carbon blocks or other means for mechanically restraining or limiting the flow of the glass.

Figure 6:
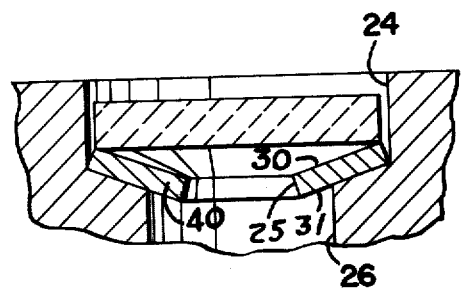
FIG. 6 shows an optional construction for the metal device.

In the modification shown in FIG. 6 bore 26 intersects counterbore 24 but there is a dished metal washer 40 that provides the smaller opening 25 and transverse surfaces 30 and 31.

We claim:

1. The method of fusing a glass disk to a metal part comprising the steps of providing the metal part with a bore, an opening and a counterbore, the opening being between and intersecting the bore and the counterbore and smaller in diameter than either so as to form a first transverse surface between the opening and the bore and a second transverse surface between the opening the counterbore, providing a glass disk having a diameter slightly smaller than the counterbore, placing the glass disk within the counterbore, supporting said part in a position with the counterbore above the opening, and subjecting the glass disk to heat sufficiently high to soften the glass so that it will flow downwardly by gravity into the opening into engagement with the wall thereof and be limited in such downward flow by cohesive forces in the glass that substantially prevent the glass from flowing radially outwardly along said first transverse surface and whereby a portion of the softened glass disk will remain in the counterbore and gravity will cause it to flow radially outwardly into contact with the wall of said counterbore and become fused thereto.

2. The method of claim 1 in which said heat is of a temperature of about 2025°F.

3. The method of of claim 1 in which said second transverse surface makes an obtuse angle with the wall of said counterbore, said opening is about one-half the diameter of said counterbore, and the temperature of said heat is about 2025°F.

4. The method of claim 1 in which said metal part has another surface against which another metal article is received, and said another metal article is brazed to the metal part at said another surface by heat applied to said metal article and metallic part simultaneously with the application of heat for softening said glass disk.

5. The method of claim 4 in which said brazing is by means of a braze material that includes copper and said heat for softening the glass is from a source that also provides the heat for said brazing and is of a temperature sufficiently high to achieve said brazing.

6. The method of fusing a glass disk to a metal part comprising the steps of providing the metal part with a bore, an opening, and a counterbore, the opening being between and intersecting the bore and counterbore and smaller in diameter than either so as to form a first transverse surface between the opening and the bore and a second transverse surface between the opening and the counterbore, said first transverse surface being at an angle of substantially 90° with the wall of the opening and the second transverse surface being substantially at an angle of 102° with the wall of the counterbore, the corner between the first transverse surface and the wall of the opening being sharp with a break of no more than about 0.005 inch, providing a glass disk having a diameter about 0.020 inch less than that of the counterbore, placing the glass disk in said counterbore adjacent said second transverse surface, supporting the part in a position with the counterbore above the opening, and subjecting the glass disk to a temperature of about 2025°F whereby the glass will be softened and a portion of the glass is caused by gravity to flow radially outwardly into fusing contact with the wall of the counterbore and form a meniscus thereagainst and another portion is caused by gravity to flow downwardly from said counterbore into said opening and into fusing contact with the wall thereof, and such softening being only to the extent that cohesive forces within the glass will prevent the glass from flowing around such corner into contact with said first transverse surface.

7. An article of manufacture comprising a metal part having a bore, an opening, and a counterbore, the opening being between the bore and counterbore and smaller in diameter than either and being about one-half the diameter of the counterbore, a first transverse surface between the bore and opening having a radial width of at least 0.020 inch and intersecting the opening at a corner of substantially no more than 0.005 inch brake and making an angle with the wall of said opening of no more than about 90°, a second transverse surface between the opening and a circumferential wall of the counterbore and lying in a cone, and a glass disk in said counterbore and opening and fused to the circumferential walls thereof and to said second transverse surface, the disk extending to said first transverse surface but not appreciably radially overlapping the same, and said disk where fused to said counterbore circumferential wall having a meniscus also fused to said counterbore circumferential wall, the meniscus being on the side of the disk remote from said opening and axially spaced from the end of the counterbore remote from the opening.

8. The article of claim 7 in which said opening is in another metal part located within said counterbore, said counterbore has a bottom wall, said second transverse surface is an end face of said another metal part, and said another metal part has another end face engaging the counterbore bottom wall.

* * * * *